United States Patent Office 3,809,610
Patented May 7, 1974

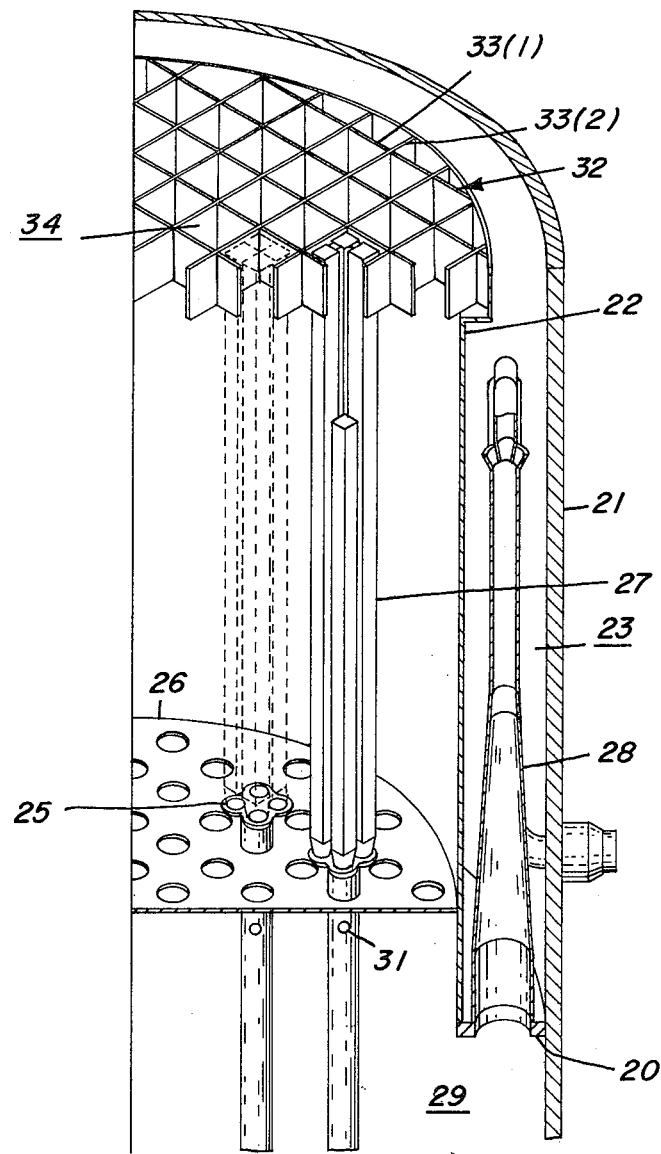
Fig. 1
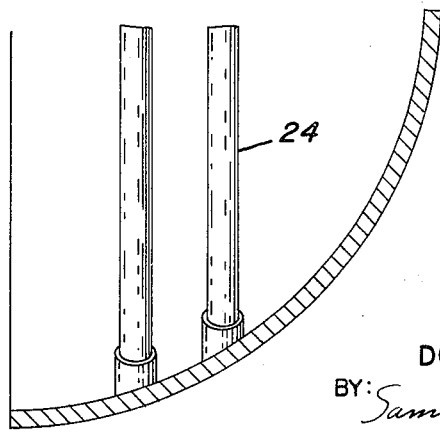

3,809,610
NUCLEAR FUEL ASSEMBLY WITH BYPASS
COOLANT CONTROL
Bart A. Smith, James L. Lass, and Dominic A. Venier,
San Jose, Calif., assignors to General Electric Company
Filed Nov. 26, 1971, Ser. No. 202,407
Int. Cl. G21c 3/34, 15/24
U.S. Cl. 176—78                                    4 Claims

ABSTRACT OF THE DISCLOSURE

A structure for limiting the exit area of the bypass coolant flow channels between the fuel assemblies in a nuclear reactor core.

BACKGROUND

In a known type of nuclear reactor, for example as used in the Dresden Nuclear Power Station near Chicago, Ill., the reactor core is of the heterogeneous type. That is, the core comprises a plurality of fuel assemblies vertically arranged in spaced array to form the nuclear reactor core capable of self-sustained nuclear fission reaction. The core is contained in a pressure vessel wherein it is submersed in a working fluid, such as light water, which serves both as a coolant and as a neutron moderator. A plurality of control rods, containing neutron absorbing material, are selectively insertable into the gaps or spaces between fuel assemblies to control the reactivity of the core.

Each fuel assembly comprises a tubular flow channel containing a fuel rod bundle formed of an array of elongated, cladded fuel elements or rods supported between upper and lower tie plates. The fuel assemblies are supported on control rod guide tube sockets in the pressure vessel between an upper core grid and a lower core plate. Each fuel assembly includes a nose piece which fits into the support socket and receives coolant from a pressurized coolant supply chamber. The pressurized coolant flows upward through the fuel assembly flow channel to remove heat from the fuel elements. A typical fuel assembly of this type is shown, for example, by D.A. Venier et al. in U.S. Pat. No. 3,350,275. In nuclear reactors of recent design, in-core nuclear instrumentation, in the form of neutron detectors, is contained in instrumentation receptacles located in the gaps or spaces between fuel assemblies.

In a water reactor heat is transferred from the fuel through the fuel rod cladding to the water flowing upward among the fuels rods. At some elevation the flowing water reaches saturation temperature and beyond this point increasing fractions of the water are in the vapor phase. Normally the heat transfer coefficient between the fuel rod cladding and the water is substantially constant. However, if the heat-flux and consequently the steam fraction is increased sufficiently, a threshold is reached at which the heat transfer coefficient decreases suddenly by a factor of 5 to 10. This is caused by a change in the heat transfer mechanism from nucleate boiling to film boiling and it results in a very rapid, undesirable rise in fuel rod cladding temperature. The heat flux at the threshold between nucleate boiling and film boiling is designated the "critical heat flux."

An important consideration in the design of boiling water reactors is the relationship between the in-channel flow (the coolant flow through the fuel assembly flow channels) and the bypass flow (the coolant flow outside the flow channels through the gaps between fuel assemblies). On the one hand it is desirable to maximize the in-channel flow to thereby maximize the margin to critical heat flux. On the ther hand it is necessary to provide a limited amount of bypass flow to avoid coolant stagnation and steam voids and to adequately cool the control rods and the in-core instrumentation devices located in the gaps between the fuel assembly flow channels. Thus for a given total core recirculation flow, the desirable balance between in-channel and bypass flow maintains an adequate margin to critical heat flux while avoiding excessive out-of-channel voids.

In a known prior arrangement bypass flow is provided by leakage of coolant between the lower tie plate of the fuel bundle and the bottom end of the flow channel surrounding the fuel bundle. It is highly desirable that the flow channel be readily removable so that it may be reused and to allow inspection of the fuel. Thus, the flow channel is not fixed to the fuel bundle but is instead a slip fit over the upper and lower tie plates and it is removably attached only to the upper tie plate. Because the flow channel is formed of relatively thin material (due to space limitations and to minimize parasitic neutron absorption) it was found that increases in coolant pressure (to increase coolant flow through the assembly) caused the flow channel to deflect away from the lower tie plate thus causing an excessive amount of bypass flow with the danger of depriving the fuel assembly of its required coolant flow. Thus it has been found desirable to provide means to control this bypass flow.

Arrangements for controlling bypass flow must be effective and reliable, they must not interfere with insertion and withdrawal of control rods under any condition, they must have sufficient and mechanical strength to withstand the reactor environment and they must maintain their effectiveness in the face of thermal expansion and contraction of the fuel assemblies. Desirably, such arrangements should add a minimum amount of material to the core, avoid interference with fuel loading and unloading, retain separability of the flow channel and fuel bundle and be economical to manufacture.

Prior arrangements for controlling this bypass flow include the following: leakage control members, such as a slotted spring, placed between the lower tie plate and the flow channel as shown in copending U.S. patent application Ser. No. 850,531, filed Aug. 15, 1969, now U.S. Pat. No. 3,689,358; devices for limiting deflection of the flow channel away from the lower tie plate as shown in copending U.S. patent application Ser. No. 850,483, filed Aug. 15, 1969, now U.S. Pat. No. 3,697,376; arrangements for reinforcing the lower part of the flow channel adjacent the lower tie plate as shown in copending patent application Ser. No. 850,485, filed Aug. 15, 1969, now abandoned.

In essence the foregoing arrangements control the bypass flow by control of the flow area between the lower tie plate and the lower end of the flow channel of the fuel assembly. These arrangements do not reduce the coolant pressure differential between the coolant within the flow channel and the bypass coolant between flow channels. The high differential pressures at high reactor power can cause outward deflection of the sides of the channels so that the width of the gaps between channels is undesirably reduced and inward deflection at the corners of the channels whereby clearance between the channel and the corner fuel rods of the bundle is undesirably reduced.

SUMMARY

An object of this invention is to provide a coolant bypass flow control arrangement which reduces the differential pressure across the flow channel walls.

This and other objects are accomplished by bypass flow area restriction devices located at the top of the core between the flow channels to control the exit of bypass flow from the core.

In accordance with a first arrangement the bypass flow area restriction devices are attached to the top end of the flow channel. This arrangement requires no changes in the core support structure and thus it readily can be applied to previously constructed reactors.

In accordance with a second arrangement the bypass flow area restriction devices are attached to the upper core support grid.

DRAWING

The invention is described more specifically hereinafter with reference to the accompanying drawing wherein:

FIG. 1 is a partly cut away perspective view of the lower portion of a pressure vessel containing a nuclear fuel core;

DESCRIPTION

Figure 2:
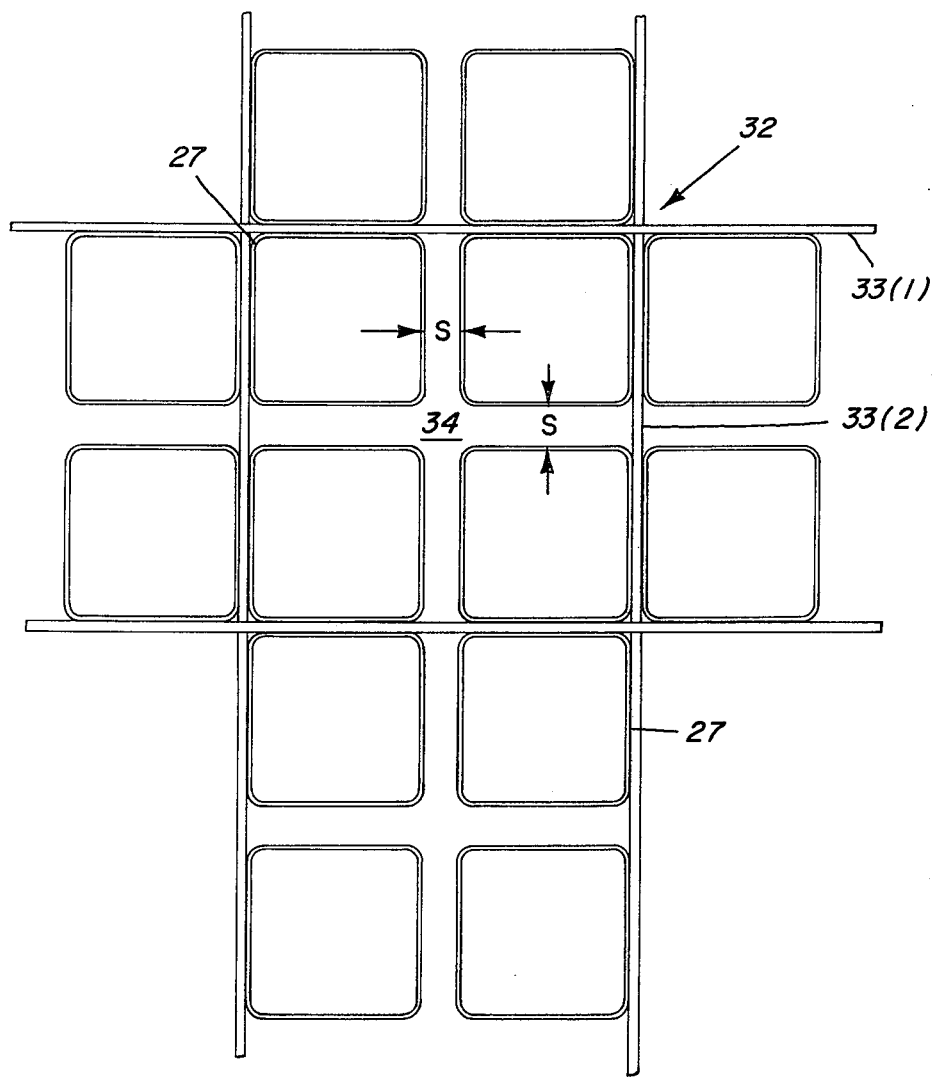
FIG. 2 is a schematic plan view of a cell of fuel assemblies.

A nuclear reactor system is illustrated, for example, in U.S. Pat. No. 3,431,170. To illustrate the present invention a portion of the core of such a reactor and a portion of the lower part of the pressure vessel containing the core is shown in FIG. 1. As shown in FIG. 1 a support ring 20 is supported within a pressure vessel 21. The ring 20 supports a cylindrical shroud 22 spaced from the vessel wall to form an annular downcomer space 23. A plurality of control rod drive tubes 24 penetrate and are supported at their bottom ends by the bottom head of the pressure vessel 21. The upper ends of tubes 24 penetrate and are laterally supported by a core bottom plate 26.

The reactor core is formed of a plurality of replaceable fuel assemblies 27 (described in greater detail hereinafter). Fixed to the top of each drive tube 24 is a fuel assembly support casting formed with four sockets 25 to receive the fuel assembly nosepieces and to support the fuel assemblies in spaced relation in groups or cells of four each.

A coolant circulation jet pump 28 receives coolant from annular space 23 and pressurizes a plenum 29 beneath the core from which the pressurized coolant is forced through openings 31 in tubes 24 and upward through the fuel assemblies 27.

At the top of the core the fuel assemblies 27 are laterally supported by a top grid 32 formed of a plurality of interlocked beams 33(1) and 33(2) to provide openings or cells 34 of square cross section. The openings 34 are axially aligned with the sockets 25 and are of a size to receive the four fuel assemblies of a fuel assembly cell. This is more clearly illustrated in FIG. 2 which is a top view of a portion of the fuel core. Within each cell 34, as illustrated in FIG. 2, the fuel assemblies 27 abut the adjacent top grid beams 33(1) and 33(2), thus providing spaces S between the fuel assemblies 27 of the cell, the spaces S being provided to accommodate a control rod of cruciform shape (not shown).

Figure 3:
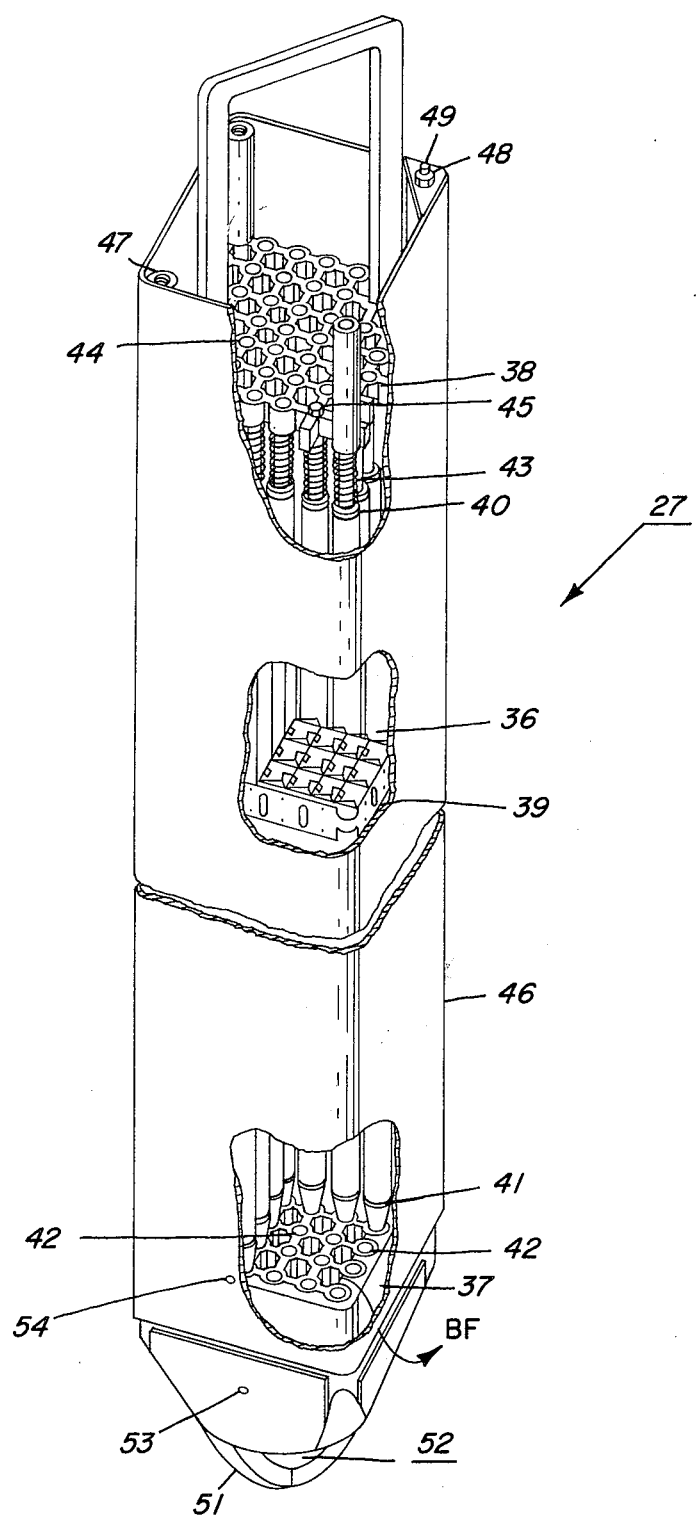
FIG. 3 is a partly cut away perspective view of a fuel assembly.

A typical fuel assembly is shown in FIG. 3. As illustrated in FIG. 3 a fuel assembly 27 comprises a plurality of elongated fuel rods 36 supported between a lower tie plate 37 and a skeletonized upper tie plate 38. The fuel rods 36 pass through a plurality of fuel rod spacers 39 which provide intermediate support to retain the elongated rods in spaced relation and restrain them from lateral vibration.

Each of the fuel rods 36 comprises an elongated tube containing the fissile fuel, in the form of pellets, particles, powder or the like, sealed in the tube by upper and lower end plugs 40 and 41. Lower end plugs 41 are formed with a taper for registration and support in support cavities 42 which are formed in the lower tie plate 37. Upper end plugs 40 are formed with extensions 43 which register with support cavities 44 in the upper tie plate 38.

Several of the support cavities 42 (for example, selected ones of the edge or peripheral cavities) in the lower tie plate 37 are formed with threads to receive fuel rods having threaded lower end plugs 41. The extensions 43 of the upper end plugs 40 of these same fuel rods are elongated to pass through the cavities in upper tie plate 38 and are formed with threads to receive internally threaded retaining nuts 45. In this manner the upper and lower tie plates and the fuel rods are formed into a unitary structure.

The fuel assembly 27 further includes a thin-walled open-ended tubular flow channel 46, of substantially square cross section, adapted to provide a sliding fit over the lower and upper tie plates 37 and 38 and the spacers 39 so that it readily may be mounted and removed. Formed at each of the four corners of upper tie plate 38 is a post 47. The channel 46 has a tab 48 welded to its end which provides for fastening the channel to the fuel bundle with a bolt 49 engaging threaded holes in one of the posts 47.

The lower tie plate 37 is formed with a nosepiece 51 adapted, as mentioned hereinbefore, to support the fuel assembly in the support socket 25 (FIG. 1). The end of the nosepiece is formed with openings 52 to receive the pressurized coolant so that it flows upward among the fuel rods.

To avoid stagnation of the coolant in the spaces S between the fuel assemblies (FIG. 2), a portion (in the order of 5–6 percent) of the coolant flow into each fuel assembly is allowed to leak into the adjacent spaces S from between the lower tie plate 37 and the flow channel 46 as indicated by the arrow legended BF in FIG. 3 or through special bypass flow passages 53 in the lower tie plate 37 or through bypass flow passages 54 in the flow channel 46.

As discussed hereinbefore, prior arrangements to regulate this bypass flow by control of the bypass flow area at the bottom of the fuel assembly, that is, at the bypass flow inlet to the spaces S, do not reduce the pressure differential between the coolant within the flow channel 46 and the bypass coolant in spaces S with the result that the channel 46 is unduly stressed or thicker channel material must be used. In accordance with the present invention bypass flow regulation is achieved by control of the bypass flow area at or near the top of the core, that is, at the bypass flow outlet from the spaces S. With such an arrangement the coolant pressure differential across the walls of the flow channel 46 is minimized whereby thinner channel wall material can be used and/or longer channel life can be achieved.

The upper core bypass flow control arrangement of the invention may take several specific structural forms, a number of which are illustrated in FIGS. 4–10.

Figure 4:
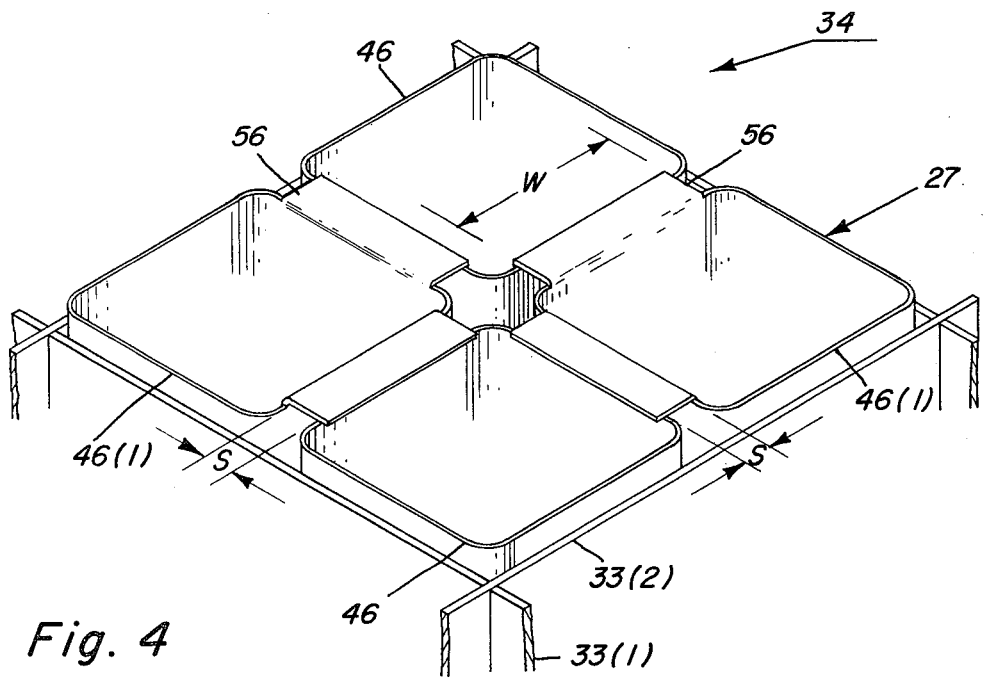
FIG. 4 is a perspective view of the upper portion of a cell of fuel assemblies illustrating an embodiment of a bypass flow control arrangement of the invention.

An illustrated form of the invention is shown in FIG. 4 which is a partial perspective view of the upper core portions of a cell of four fuel assemblies 27. In this embodiment two diagonally opposite flow channels 46(1) are modified by forming at the upper ends of each, at two adjacent sides thereof, lateral extensions 56 of sufficient length to overlap the adjacent sides of the other (unmodified) flow channels 46. In this way the exit area from the spaces S is reduced thereby creating greater pressure in the spaces S and limiting the rate of bypass coolant flow therefrom. The width W of the extensions 56 can be selected to leave the amount of the exit flow area required to provide the desired rate of bypass coolant flow.

Figure 5:
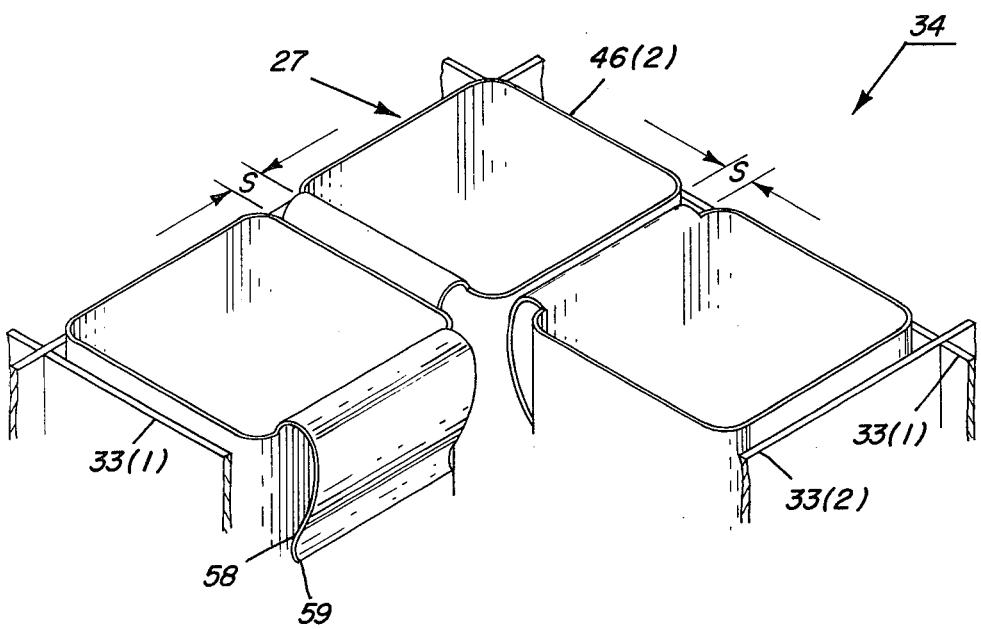
FIG. 5 is a perspective view illustrating another embodiment of the invention.

Another form of the invention is illustrated in FIG. 5 wherein flow channels 46(2) are modified by forming at the upper end of each a curved lateral extension or loop 58 extending outwardly and downwardly into the space S to thus reduce the bypass flow exit area at the tops of the flow channels. The end 59 of the extension 58 is preferably formed with an outward curve to provide a smooth bearing surface against the side of the flow channel 46(2).

Figure 6:
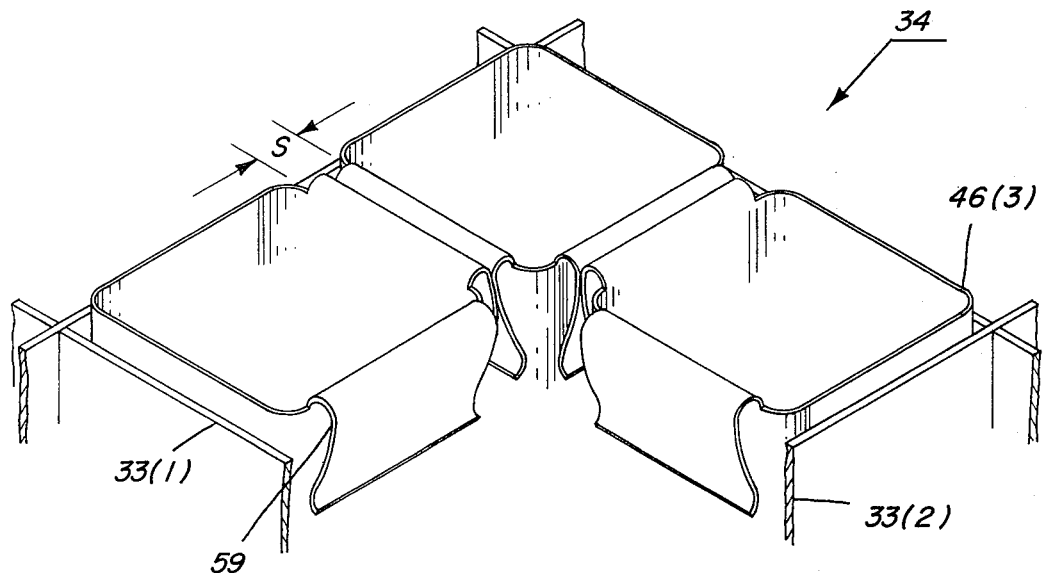
FIG. 6 illustrates a modification of the embodiment of FIG. 5.

A modification of this embodiment of the invention is illustrated in FIG. 6. Flow channels 46(3) are formed with downwardly curved lateral extensions or loops 59 along the two adjacent sides facing the directly opposite flow channels of the cell 34. Thhe extensions 59 extend laterally about one-half the width of the space S so that the facing extensions 59 bear against one another. Being formed of relatively thin material and on a relatively large radius of curvature, the loops 58 and 59 of FIGS. 5 and 6 provide a degree of resilient engagement.

Figure 7:
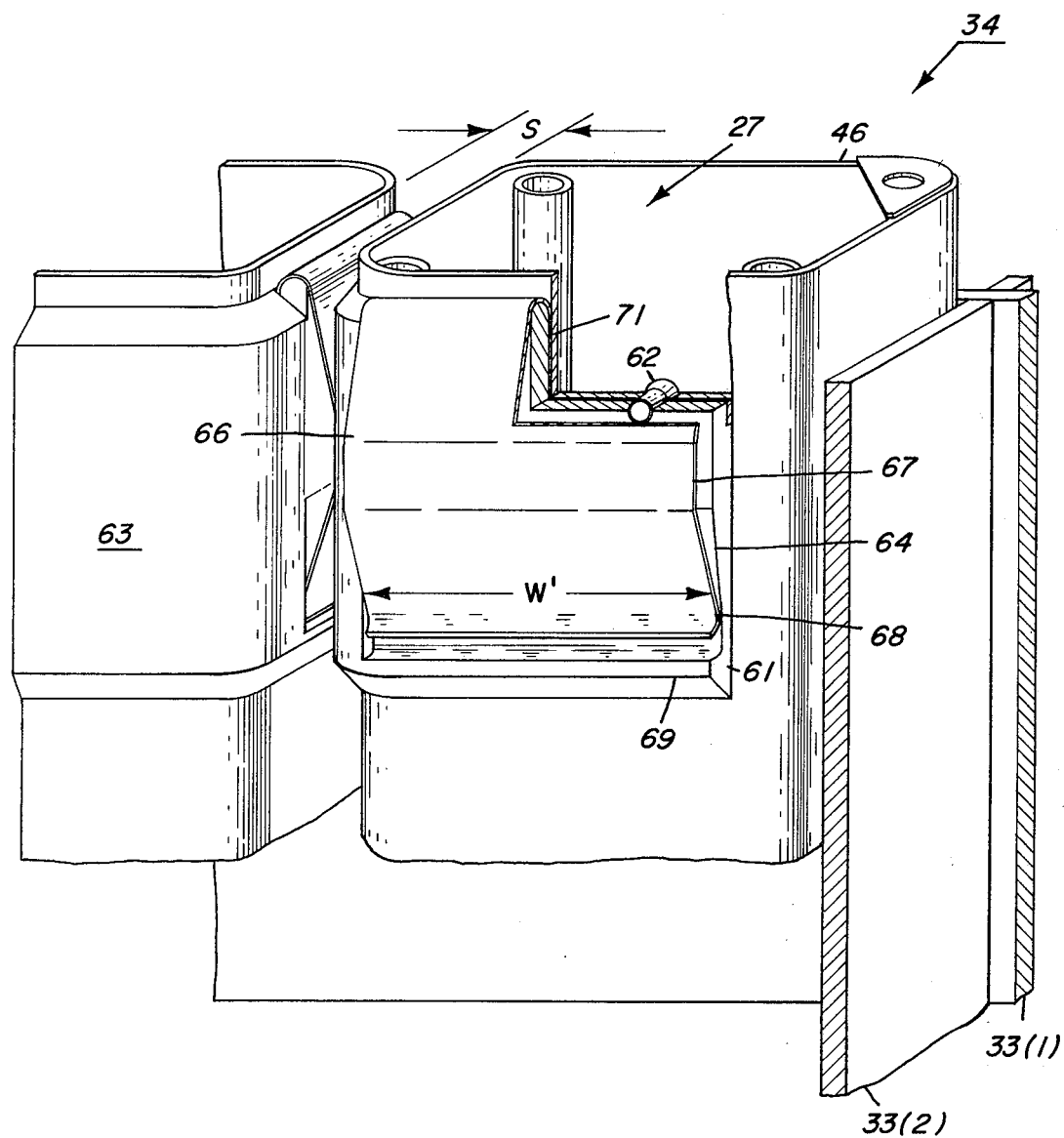
FIG. 7 is a perspective view of another embodiment of a bypass flow control arrangement according to the invention.

Another embodiment of the invention is illustrated in FIG. 7. In this embodiment an L-shaped spring backing and bearing member 61 is attached to the upper end of the adjacent inward sides of each of the flow channels 46 of the cell 34 by fasteners 62 such as bolts, rivets or the like. One leg of member 61 is formed with a spring bearing surface 63 while the other leg of this member is formed with a spring backing surface 64. Overlapping the spring backing surface is a spring member 66. The spring member is formed with a curvature so that it arches laterally outward into the space S. Preferably the spring member 66 is formed with a central realtively flat portion 67 adapted to bear against the bearing surface 63 of the opposing member 61. The spring member 66 is also formed with an outwardly curved lower end 68 to provide a curved bearing surface against the backing surface 64. The backing surface 64 may be formed with a raised spring stop 69. The spring 66 may be attached by a folded-over upper portion 71 positioned in a recess between member 61 and the flow channel 46 and captured by the bolts or rivets 62. The width W' of the spring members 66 is selected to provide the desired reduction in bypass flow exit area and is normally a substantial portion of the width of the flow channel 46 as illustrated in FIG. 7.

Figure 8:
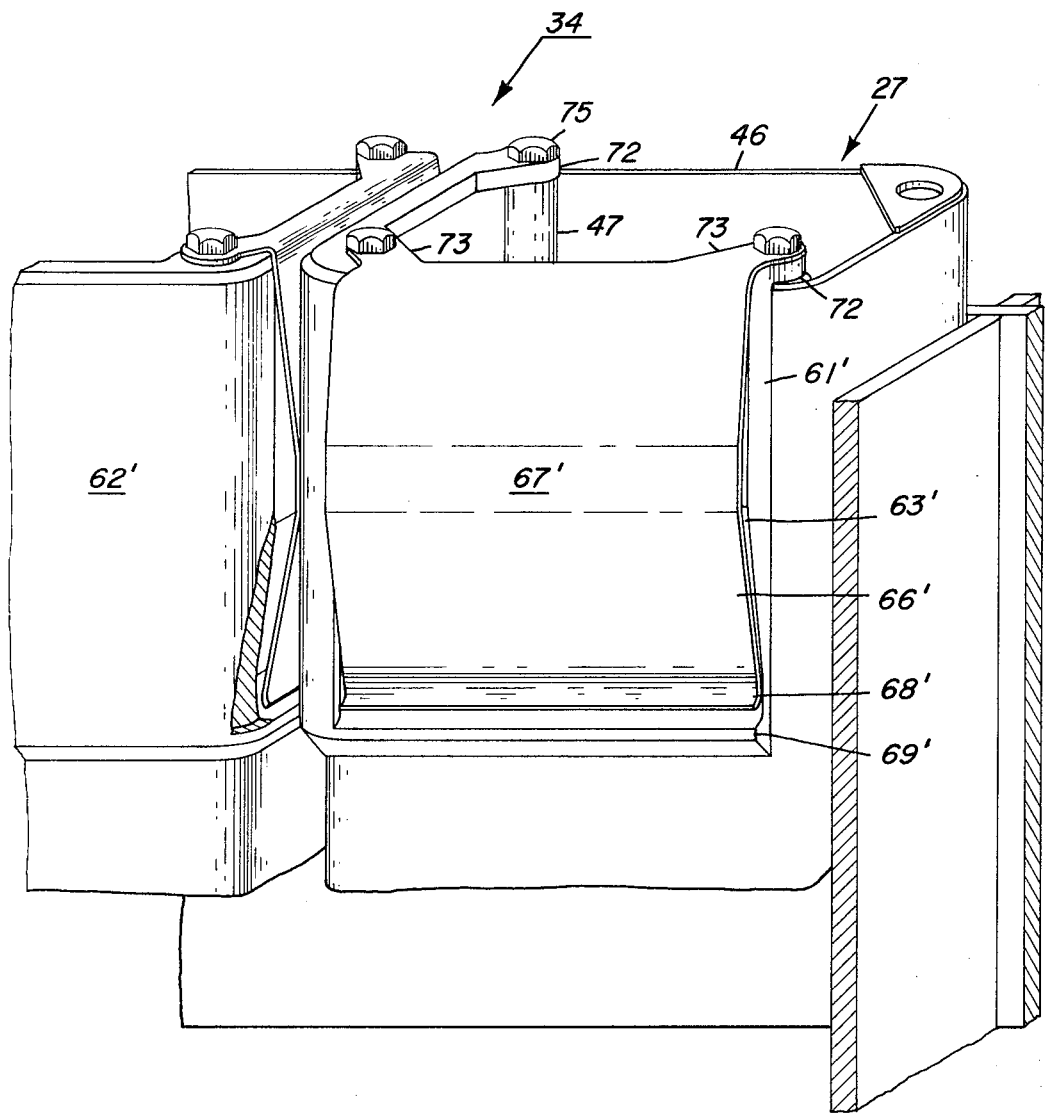
FIG. 8 illustrates a modification of the embodiment of FIG. 7.

The embodiment of FIG. 7 can be modified to provide attachment to the upper tie plate of the fuel assembly rather than to the flow channel. This modification is illustrated in FIG. 8. It includes L-shaped spring backing and bearing members 64' with spring members 66' overlapping the surfaces 63'. Spring members 66' are formed with a flat portion 67' and an outwardly curved lower end 68'. The backing surface 64' terminates at its lower end with a raised stop 69'. The backing and bearing member 61' and the spring member 66' are not attached to the flow channel 46 but are instead formed with laterally extending ears 72 and 73, respectively, which overlap the adjacent standards or posts 47 formed in the upper tie plate 38 (FIG. 3) of the fuel assembly. These ears are drilled with clearance holes to pass cap screws 75 which fit into threaded holes in the posts 47 to secure the members 61' and 66'. Thus this embodiment provides the advantage that the members 61' and 66' are readily removable, for example, for replacement.

Figure 9:
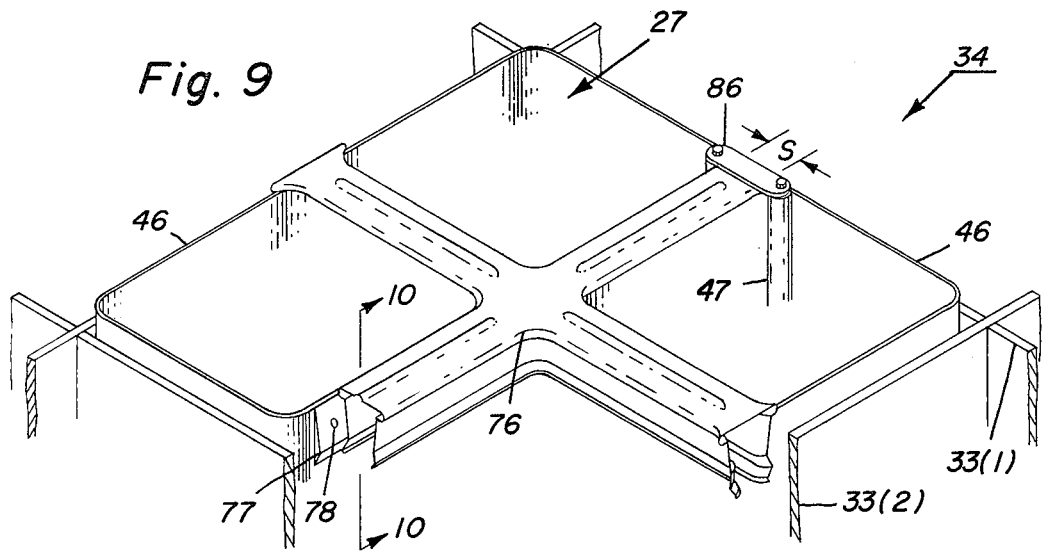
FIGS. 9 and 10 illustrate a further embodiment of the invention.
Figure 10:
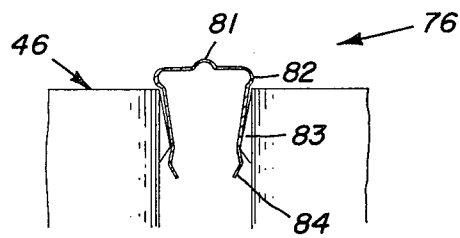

A further bypass coolant flow control arrangement of the invention is shown in FIGS. 9 and 10. In this embodiment a cross or cruciform shaped member 76 is engaged and retained in place between the fuel assemblies 27 of the cell 34 by triangularly shaped latch bars 77 attached, as by rivets 78, to the facing upper ends of the flow channels 46. A suitable cross section shape of the member 76 is shown in the detail end view of FIG. 10. Top ribs 81 provide longitudinal rigidity. Side ribs 82 overlap the top ends of the flow channels and limit the depth of insertion of the members 76 into the spaces S. Resilient sides 83 of member 76 are formed with hook-shaped lower edges 84 adapted to latch under the lower edges of latch bars 77. If found necessary, retainer straps 86 overlaying the ends of member 76 and attached to posts 47 of the fuel assemblies can be added to assure that the member 76 is not displaced by the pressure of the bypass coolant in spaces S.

Figure 11:
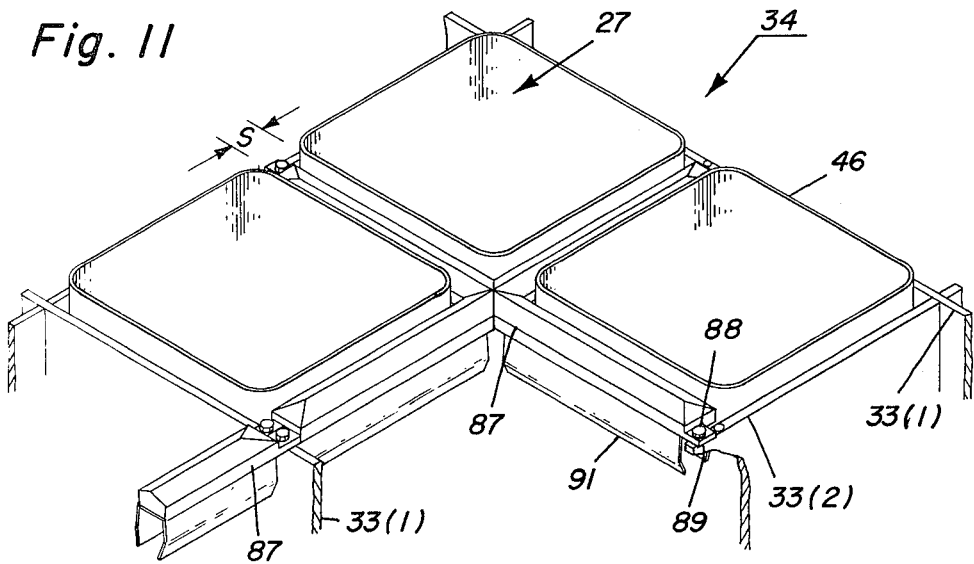
FIG. 11 is a perspective view of another embodiment of the invention.

Another embodiment of a bypass coolant flow control arrangement of the invention is illustrated in FIG. 11. In this embodiment a cross or cruciform shaped member 87 is retained in place between the fuel assemblies 27 of the cell 34 by attachment to the beams 33(1) and 33(2) of top grid 32 (FIG. 2) by, for example, bolts 88. Attachment tabs 89 at the ends of the arms of member 87 are of half-width to allow attachment of similar members 87 in the adjacent cells 34. To provide an effective seal against the flow channels 46, a resilient, inverted U-shaped channel 91 may be attached to the lower side of each of the arms of the member 87.

Thus what has been described is effective means for control of bypass coolant flow by a partial seal at the exit (upper) end of the bypass flow spaces whereby coolant pressure differential across the flow channel walls is reduced.

What is claimed is:

1. In a nuclear fuel assembly including an array of fuel elements and a tublar flow channel having a top end and a bottom end and having at least four sides surrounding said array to conduct a flow of coolant through said bottom end past said fuel elements, bypass coolant flow control means for impeding a flow of coolant along the outside of said channel, comprising: a backing assembly attached to said fuel assembly and extending downwardly along the outer surface of two adjacent sides of the top end of said flow channel, said backing assembly extending across substantially more than one-half the width of each of said two adjacent sides; and a spring assembly comprising spring members overlaying said backing assembly along one of said two adjacent sides and extending across more than one-half the width of said one of two said adjacent sides, whereby the spring assembly of one fuel assembly is adapted to contact the backing assembly of an adjacent fuel assembly not overlayed by a spring.

2. The bypass flow control means of claim 1 wherein said backing assembly and said spring assembly are attached to said flow channel.

3. In the fuel assembly of claim 1 wherein said fuel assembly includes an upper tie plate and wherein said backing assembly and said spring assembly are attached to said upper tie plate.

4. The bypass flow control means of claim 1 wherein said spring member is formed with a lower end portion curved outwardly from said backing assembly.

References Cited

UNITED STATES PATENTS

Re. 27,173    9/1971    Lass et al.    176—78
3,689,358    9/1972    Smith et al.    176—76

CARL D. DUARFORTH, Primary Examiner

R. S. GAITHER, Assistant Examiner

U.S. Cl. X.R.

176—78

UNITED STATES PATENT OFFICE
CERTIFICATE OF CORRECTION

Patent No. 3,809,610                    Dated May 7, 1974

Inventor(s) B. A. Smith/J. L. Lass/D. A. Venier

It is certified that error appears in the above-identified patent and that said Letters Patent are hereby corrected as shown below:

Column 1, line 49, "fuels" should be --fuel--; line 70, "ther" should be --other--. Column 4, line 30, after "its" insert --top--. Column 5, line 16, "Thhe" should be --The--; line 34, "realtively" should be --relatively--; line 51, change "64'" to --61'-- and then insert --having spring bearing surfaces 63' and spring backing surfaces 64'--. Column 6, Claim 1, line 2, "tublar" should be --tubular--.

Signed and sealed this 3rd day of December 1974.

(SEAL)
Attest:

McCOY M. GIBSON JR.                C. MARSHALL DANN
Attesting Officer                  Commissioner of Patents